United States Patent
Otter

(10) Patent No.: US 6,648,066 B2
(45) Date of Patent: Nov. 18, 2003

(54) METHOD OF MAKING A CONDENSING HEAT EXCHANGER BY DIRECT EXTRUSION COATING OF A FILM

(75) Inventor: James William Otter, Fairfield Glade, TN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/923,553

(22) Filed: Aug. 7, 2001

(65) Prior Publication Data

US 2003/0029606 A1 Feb. 13, 2003

(51) Int. Cl.[7] .............................................. F28F 19/02
(52) U.S. Cl. ................ 165/133; 29/890.03; 156/244.27
(58) Field of Search ...................... 165/133; 29/890.23; 156/244.27; 427/375

(56) References Cited

U.S. PATENT DOCUMENTS 3,834,009 A * 9/1974 Iida et al. .................... 228/147
4,071,048 A * 1/1978 Watase ........................ 138/139
4,133,710 A * 1/1979 Wartenberg ............. 156/244.27
4,193,180 A * 3/1980 Press ....................... 156/244.13
4,296,804 A * 10/1981 Press et al. .................. 165/133

FOREIGN PATENT DOCUMENTS

EP          1052458 A2 * 11/2000     ............ F24F/3/147

* cited by examiner

Primary Examiner—Allen Flanigan
(74) Attorney, Agent, or Firm—Carlton, Gaskey & Olds

(57) ABSTRACT

A thermoplastic polymer film is directly extruded onto the heated surface of a metal condensing heat exchanger. Any thermoplastic polymer capable of being adhered to the metal surface of the condensing heat exchanger can be utilized. Preferably, the thermoplastic polymer is a polyester, a polyolefin with an added maleate or tackifier to ensure adhesion, polyetherimide, polyethersulfone, polysufone or polyimide. The thermoplastic film must be resistant to the conditions of the condensing heat exchanger, such as the high temperature flue vent gases and the acidic condensate formed from condensation.

14 Claims, 1 Drawing Sheet

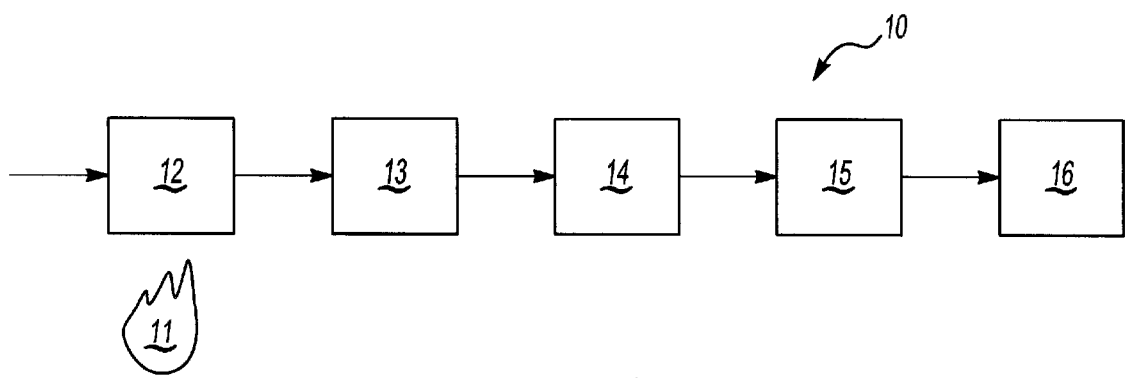
*Fig-1*
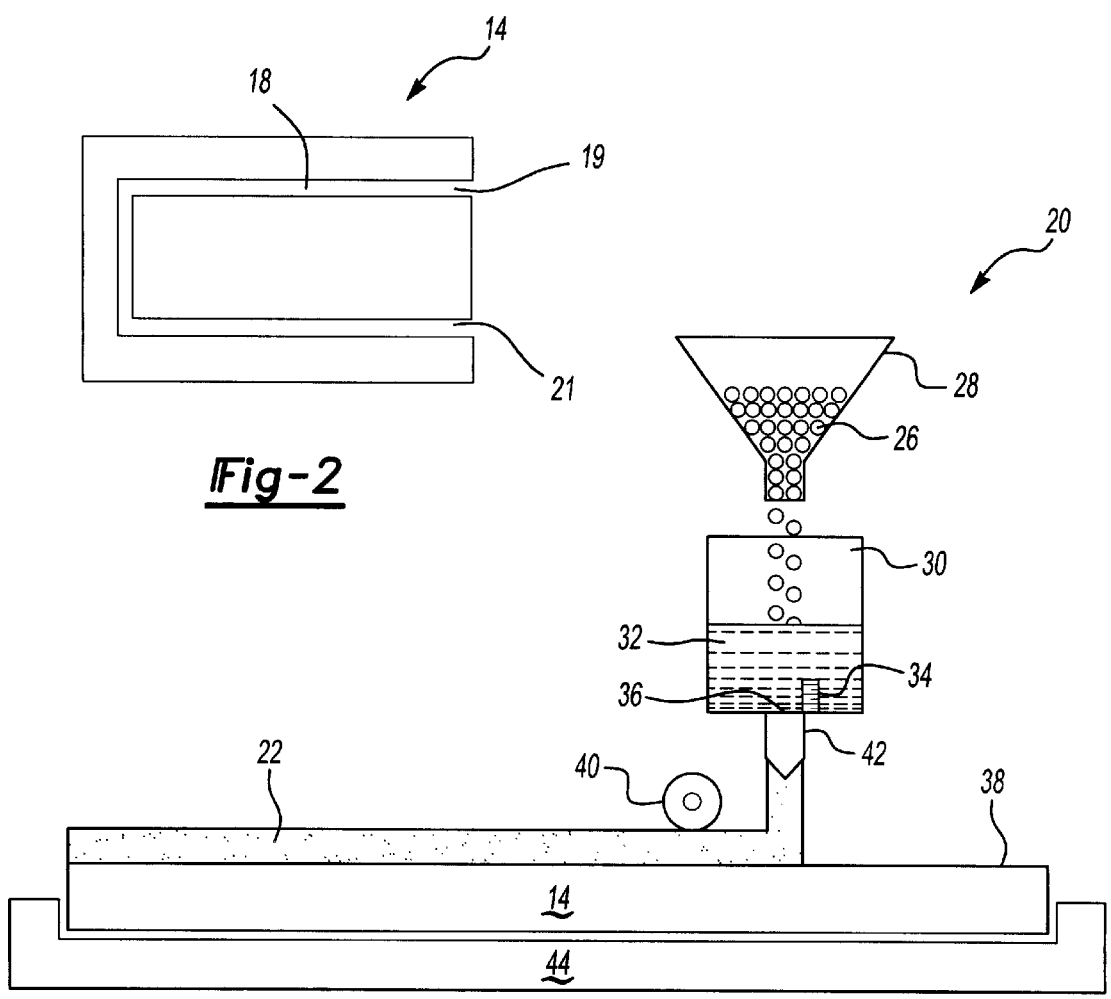
*Fig-2*
*Fig-3*

METHOD OF MAKING A CONDENSING HEAT EXCHANGER BY DIRECT EXTRUSION COATING OF A FILM

BACKGROUND OF THE INVENTION

The present invention relates generally to a method for making a condensing heat exchanger which can be used at higher temperatures by extrusion coating a melted thermoplastic polymer directly onto the heated surface of the metal condensing heat exchanger.

Condensing heat exchangers are employed in condensing furnaces to increase efficiency. The condensing heat exchanger cools the heating fluid to a temperature below the dew point. As the temperature drops below the dew point, a liquid condensate, water vapor, condenses from the heating fluid. As the liquid condensate condenses, heat is transferred from the water vapor to the air to be heated. As more heat is produced, the efficiency of the system is increased.

Polypropylene films are commonly utilized to make a laminated condensing heat exchanger material to prevent corrosion of the heat exchanger by the water vapor liquid condensate. In prior condensing heat exchangers, the film is formed by melted polypropylene pellets which are extruded or cast to form a film. The metal surface of the condensing heat exchanger is then heated. The film is applied to the heated condensing heat exchanger, and the heated surface slightly melts the film, adhering the film to the condensing heat exchanger. A roller passes over the surface of the film to further adhere the film to the condensing heat exchanger. Alternatively, the film is adhered to the metal with an appropriate adhesive and primer.

There are several drawbacks to the polypropylene film of the prior art. For one, the present polypropylene film can be used only at relatively lower temperatures. The prior art process can be used to make a film which can be used at higher temperatures, but manufacturing of these films is difficult and expensive as the surface of the heat exchanger must be heated to a relatively higher temperature in order to slightly melt and adhere the film to the condensing heat exchanger. Additionally, there is a limitation on how hot the metal heat exchanger can be heated in a commercial oven.

Hence, there is a need in the art for a method for making a condensing heat exchanger which can be used at higher temperatures by applying a film having high thermal and chemical resistance.

SUMMARY OF THE INVENTION

The present invention relates to a method for making a condensing heat exchanger which can be used at higher temperatures.

A thermoplastic polymer film is directly extruded onto the heated surface of a metal condensing heat exchanger. The thermoplastic polymer in the form of a plurality of pellets are dropped in a hollow cylinder and heated to form a melted thermoplastic polymer. An internal screw in the cylinder stirs and pushes the melted thermoplastic polymer through an orifice in the cylinder and directly onto the heated surface of the metal condensing heat exchanger. The melted thermoplastic polymer self-glues to the heated condensing heat exchanger, forming the thermoplastic film. A pressure roller is preferably utilized to bring the thermoplastic film into direct contact with the heated surface of the condensing heat exchanger.

Any thermoplastic polymer which is capable of being adhered to the heated metal surface of the condensing heat exchanger can be utilized to form the thermoplastic film. Preferably, the thermoplastic polymer is a polyester, such as polybutylene terephthalate or polyethylene terephthalate. Alternatively, a polyolefin, such as polypropylene or polyethylene, can be used as the thermoplastic polymer. A maleate or a tackifier must be mixed with a polyolefin for proper adhesion or bonding to the heated surface of the condensing heat exchanger. Polyetherimide, polyethersulfone, polysufone or polyimide can also be utilized as the thermoplastic polymer. Once adhered, the thermoplastic film must be resistant to the conditions of the condensing heat exchanger, such as high temperature flue vent gases and the acidic condensate formed during condensation.

Accordingly, the present invention provides a method for making a condensing heat exchanger which can be used at higher temperatures.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows:

FIG. 1 illustrates a schematic diagram of a condensing furnace system;

FIG. 2 illustrates a diagram of a condensing heat exchanger; and

FIG. 3 illustrates a schematic diagram of an apparatus for applying the thermoplastic polymer film of the present invention to the heated surface of a condensing heat exchanger.

DETAILED DESCRIPTION OF THE PREFERRED EMBODIMENT

FIG. 1 schematically illustrates a condensing furnace system 10. Air and natural gas enters a burner 12 which burns the air and natural gas by a flame 11 to produce hot combustion products. The hot combustion products pass through a primary heat exchanger 13, which cools the hot combustion products and extracts heat to the air to be heated. To increase the efficiency of the system 10, a condensing heat exchanger 14 is used to extract additional heat. As the hot combustion gases pass through the condensing heat exchanger 14, the condensing heat exchanger 14 cools the combustion products to a temperature below the dewpoint of the combustion products. Water vapor begins to condense, allowing more heat to be extracted from the combustion products and increasing efficiency. As the liquid condensate condenses, heat is transferred from the water vapor to the air to be heated. An inducer fan 15 provides a source of suction on the condensing heat exchanger 14 and assists in pulling the flow of the combustion products through the system 10. The combustion products are expelled from the system 10 through a flue 16.

FIG. 2 illustrates a diagram of a condensing heat exchanger 14. The condensing heat exchanger 14 includes a plurality of flow passages 18 which contains a heating fluid.

Hot flue gases enter the condensing heat exchanger 14 at the inlet 19. The condensing heat exchanger 14 cools heating fluid to a temperature below the dew point. As the temperature drops below the dew point, a liquid condensate, water vapor, condenses on the condensing heat exchanger 14, transferring heat from the water vapor to the air to be heated. The cooled flue gases then exit the condensing heat exchanger through the outlet 21.

Referring now to FIG. 3, an apparatus 20 for applying a thermoplastic polymer film 22 to a heated metal condensing heat exchanger 14 of a condensing furnace is shown schematically. The film 22 of the present invention is formed of a thermoplastic polymer. The thermoplastic polymer in the form of a plurality of pellets 26 are stored in a heated funnel 28. The pellets 26 are dropped in a hollow cylinder 30 and are heated to form a melted thermoplastic polymer 32. The cylinder 30 includes a heated internal screw 34 which stirs the melted thermoplastic polymer 32 during melting and pushes the melted thermoplastic polymer 32 through an orifice 36 in the cylinder 30.

The melted thermoplastic polymer 32 is extruded through a heated extrusion head 42 directly onto the heated surface 38 of the metal heat exchanger 14. As the surface 38 of the condensing heat exchanger 14 is heated by an oven 44 and the melted thermoplastic polymer 32 is applied in a heated melted form, the melted thermoplastic polymer 32 is self-glued to the heat exchanger 14. Once the melted thermoplastic polymer 32 cools, the thermoplastic film 22 is formed. Preferably, a pressure roller 40 is utilized to bring the thermoplastic film 22 into direct contact with the surface 38 of the condensing heat exchanger 14, further providing adhesion. Preferably, the thermoplastic film 22 is 0.2 to 10 mils in thickness, and most preferably the film 22 is 1 to 6 mil in thickness.

Any thermoplastic polymer 32 which is capable of being adhered to or is capable of being modified to be adhered to the heated surface 38 of the condensing heat exchanger 14 can be employed to form the thermoplastic film 22. In one embodiment, the thermoplastic polymer 32 is a polyester, such as polybutylene terephthalate or polyethylene terephthalate. Alternatively, a polyolefin, such as polypropylene or polyethylene, can be employed as the thermoplastic polymer 32. In this embodiment, a maleate or a tackifier must be mixed with the polyolefin to provide for proper adhesion or bonding to the heated surface 38 of the condensing heat exchanger 14. Polyetherimide, polyethersulfone, polysufone or polyimide can also be utilized as the thermoplastic polymer 32. Additionally, polypropylene can be utilized.

The thermoplastic film 22 employed must possess exceptional temperature resistance to the high temperature flue vent gases, and must have physical and chemical resistance to the acidic condensate formed by the condensing heat exchanger 14. The thermoplastic film 22 must be able to possess these characteristic for an acceptable length of time, preferably the expected life of the condensing furnace.

There are several advantages to employing the method of making the thermoplastic film 22 for a condensing heat exchanger 14 of the present invention. For one, a thermoplastic film 22 with a high temperature resistance can be formed on the metal surface 38 of a heat exchanger 14 at a lower cost. It is difficult and expensive to manufacture a higher temperature film using the prior art method as the entire metal surface 38 of the heat exchanger 14 must be heated to a temperature high enough to slightly melt the high temperature thermoplastic film. By employing the process of the present invention, the metal surface 38 of the condensing heat exchanger 14 does not have to be heated as hot because the thermoplastic polymer 32 is applied in the melted form. As the temperature of surface 38 of the heat exchanger 14 can be lower, the cost of making the thermoplastic film 22 is less as less energy is needed.

Additionally, the extrusion coating process of the present invention processes the thermoplastic film 22 less than the thermal laminating process of the prior art. Therefore, the film 22 will have better properties and be less degraded.

Accordingly, the present invention provides a method for making a condensing heat exchanger which can be used at higher temperatures.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for making a heat transfer component comprising the steps of:
    applying a melted polymer to a surface of said heat transfer component to form a film;
    applying pressure to said film to adhere said film to said surface of said heat transfer component; and
    utilizing said heat transfer component to exchange heat between a first fluid and a second fluid.

2. The method as recited in claim 1 wherein said film is thermoplastic.

3. The method as recited in claim 1 further comprising the step of heating said surface of said heat transfer component.

4. The method as recited in claim 1 wherein the step of applying pressure to said film comprises applying pressure by a roller.

5. The method as recited in claim 1 further comprising the step of melting a plurality of polymer pellets to form said melted polymer.

6. The method as recited in claim 1 wherein said film is formed from a melted polymer selected from the group consisting of polyester, polyolefin, polyetherimide, polyethersulfone, polysufone and polyimide.

7. The method as recited in claim 6 wherein said film is formed of polyolefin and is mixed with a tackifier to adhere said film to said surface.

8. A method as recited in claim 6 wherein said film is formed of polyolefin and is mixed with a maleated polyolefin to adheres said film to said surface.

9. The method as recited in claim 1 wherein said surface of said heat transfer component is flat.

10. The method as recited in claim 1 wherein said heat transfer component is employed in a condensing heat exchanger.

11. The method as recited in claim 1 wherein said film is formed from a melted polymer selected from the group consisting of polyetherimide, polyethersulfone, polysufone and polyimide.

12. The method as recited in claim 3 wherein said surface of said heat transfer component is heated by an oven.

13. The method as recited in claim 6 wherein said polyester is selected from the group consisting of polybutylene therephthalate and polyethylene therephthalate.

14. The method as recited in claim 6 wherein said polyolefin is selected from the group consisting of polypropylene and polyethylene.

* * * * *

UNITED STATES PATENT AND TRADEMARK OFFICE
CERTIFICATE OF CORRECTION

PATENT NO. : 6,648,066 B2
DATED : November 18, 2003
INVENTOR(S) : Otter

It is certified that error appears in the above-identified patent and that said Letters Patent is hereby corrected as shown below:

<u>Column 4,</u>
Line 48, "adheres" should be -- adhere --

Signed and Sealed this

Thirteenth Day of January, 2004

JON W. DUDAS
*Acting Director of the United States Patent and Trademark Office*